I. H. CALIGA.
CAR FENDER.
APPLICATION FILED JULY 6, 1909.
951,100.
Patented Mar. 8, 1910.
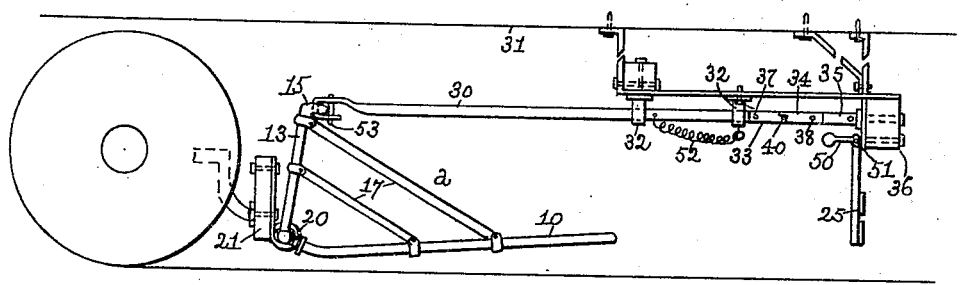
Fig. 1.
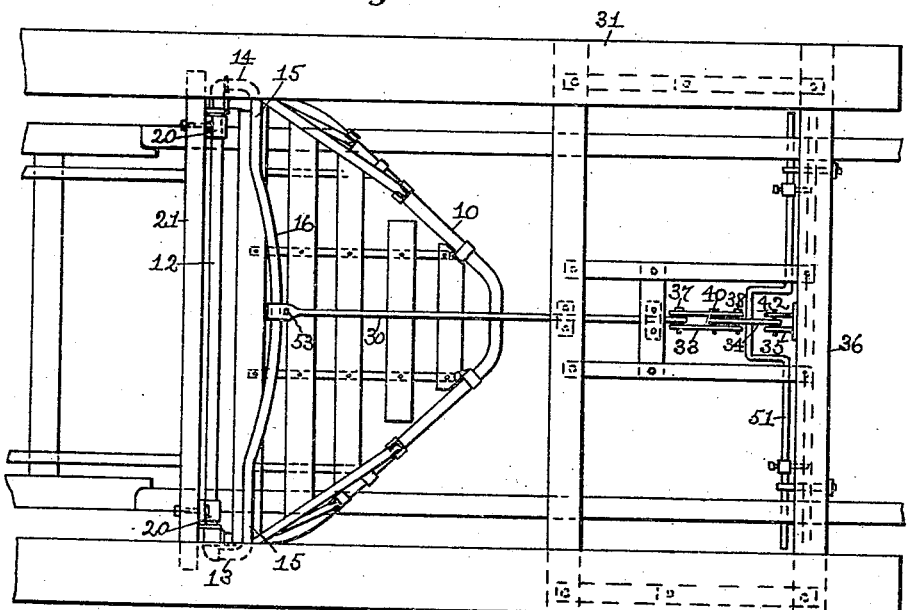
Fig. 2.
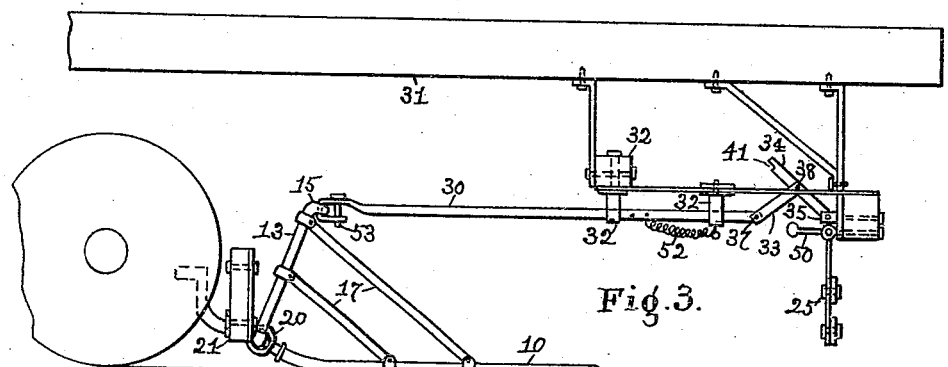
Fig. 3.
Fig. 4.
Witnesses.
C. H. Gannett
J. Murphy
Inventor.
Isaac H. Caliga
by Jas. H. Churchill
atty.

UNITED STATES PATENT OFFICE.

ISAAC HENRY CALIGA, OF SALEM, MASSACHUSETTS.

CAR-FENDER.

951,100.

Specification of Letters Patent.

Patented Mar. 8, 1910.

Application filed July 6, 1909. Serial No. 506,022.

*To all whom it may concern:*

Be it known that I, ISAAC HENRY CALIGA, a citizen of the United States, residing in Salem, county of Essex, and State of Massachusetts, have invented an Improvement in Car-Fenders, of which the following description, in connection with the accompanying drawings, is a specification, like characters on the drawings representing like parts.

This invention relates to car fenders of that class in which the fender is located beneath the car body and is automatically operated by a gate or tripping device located near the end of the car.

The present invention has for its object to provide a simple, efficient and reliable fender of the class described, which is capable of being attached to the car body or to the car truck, either rigid or swivel, and provision is made for locking the fender in its raised position and for unlocking the same by a predetermined movement of the swing gate. To this end, the fender, which may be pivoted either to the car truck or to a support depending from the car body, has connected to it one end of a link, which is connected by toggle levers as will be described, to a stationary support, such as a cross bar, which is hung below the car platform. The toggle levers have coöperating with them a crank or arm on a rock-shaft from which the gate is hung, said crank or arm being disconnected from the toggle levers, so as to allow a limited swinging movement of the gate before the said arm acts on the toggle with a blow to break the same. These and other features of this invention will be pointed out in the claims at the end of this specification.

Figure 1 is a side elevation of a sufficient portion of a street railway car provided with a fender embodying this invention to enable it to be understood. Fig. 2, a plan view of the fender shown in Fig. 1. Fig. 3, a side elevation of the fender in its lowered or operative position, and Fig. 4, a detail in plan to be referred to.

Referring to the drawings, *a* represents the fender proper, which may be of any suitable construction, but preferably that herein shown, it comprising a horizontal platform 10 substantially triangular in shape and having a cross-bar 12, which forms a pivot for the platform 10. The pivot bar 12 has connected to its ends upright bars or rods 13, 14, which are joined together by a cross bar 15 having as shown a central portion 16 curved in an arc with the center pin of the truck as a center when a swivel truck is used. The upright bars or rods 13, 14, are connected to the side bars of the platform 10 by inclined bars 17, which form sides for the platform. In the present instance, the fender proper is shown as pivotally secured by metal straps 20 to the wheel guard or pilot board 21.

The fender *a* is designed to be normally elevated above the roadway as shown in Fig. 1, and to be maintained in its elevated position until lowered by the body of a person or other object on the track striking a swinging gate or tripping device 25.

In accordance with this invention, the fender has connected with the cross bar 15 a link or rod 30, extended toward the end of the car body 31 and slidable on suitable hangers 32 supported from the car body. The link or rod 30 has pivotally connected to it one member 33 of a toggle, the other member 34 of which is pivoted to a stationary support, shown as brackets 35 attached to a stationary support or cross bar 36 suspended from the front end of the car body near the end of the plaform. The member 33 of the toggle is preferably composed of two levers mounted on the pivot pin 37 at one end and the center pivot 38 at the other end, and between said pins the levers carry a pin 40, which constitutes a stop, with which engages the notched end 41 of the member 34, which is made as a single lever, mounted on the pivot pin 42 carried by the brackets 35 (see Fig. 4). In the straightened or closed position of the toggle, shown in Fig. 1, the notched end 41 rests on the stop pin 40 and at such time the toggle levers coöperate with the brackets 35 and link 30 to form a practically rigid connection between the fender and the stationary support 36, with the result that the fender is held in its elevated position above the road bed with surety, and is unaffected by vertical movement of the fender, caused by the teetering of the car body or a vertical movement of the car truck. When the fender is to be lowered into its operative position shown in Fig. 3, the toggle is broken, which is automatically effected by a crank or arm 50 on a rock-shaft 51 supported by the cross-bar 36 and having attached thereto the depending gate 25. Normally the crank or arm 50 is out of engagement with the toggle member 34 and is below the same a sufficient distance to permit the gate 25 to swing a limited distance, to enable stones and like objects to pass under without breaking the toggle. If however, the gate should strike a person on the track, it would be swung back far enough to cause the crank or arm 50 to strike the member 34 a sharp blow and break the toggle substantially in an instant, thereby allowing the fender to drop by gravity, assisted it may be by a spring 52. The toggle may be reset by the operator lifting the fender or by pushing back on the upright bar 13 or 14, which may be effected from the side of the car by the usual switch stick carried on the car.

The link 30 is connected with the cross bar 15 as shown, by bending its end about the said cross bar to form a loop, which is closed by a pin or bolt 53.

By providing the cross bar 15 with a curved portion intermediate its ends, which has the center pin of the truck as a center, the truck is free to turn or swivel without disturbing the toggle mechanism. As soon as the gate 25 has passed over the person on the track, it returns to its normal position by gravity.

Claims.

1. In a railway car, in combination, a pivoted fender located below the car body, a link connected at one end to said fender, a lever to which the other end of said link is connected, a stop on said lever intermediate its ends, a second lever pivoted at one end to a fixed support below the car body and pivoted intermediate its ends to the first mentioned lever to form a toggle, the second toggle lever having its free end provided with a notch which engages the said stop, a swinging gate mounted on a stationary support below the car body and provided with a rearwardly extended arm disconnected from said toggle levers to permit the gate to have a limited motion without engaging the said toggle levers and coöperating with one of said toggle levers to strike the same a blow and disengage it from its stop and break the toggle, substantially as described.

2. In a railway car, in combination, a pivoted fender located below the car body and secured to the car truck to move therewith, said fender having a curved cross bar, a link connected with said curved cross bar to permit the fender to turn laterally with the truck without moving the said link, a stationary support located below the car body, toggle levers connected with said stationary support and said link, and a swinging gate provided with a crank or arm to engage one of the toggle levers and break the toggle, substantially as described.

3. In a railway car, in combination, a fender located below the car body and movable toward the tracks, a link or bar connected with said fender, a toggle mechanism comprising two members, one of which is pivotally connected with said link and is provided with a stop, and the other of which is pivoted at one end to a fixed support and intermediate its ends to the first mentioned member and has its free end arranged to engage said stop, a swinging gate pivoted to a fixed support and provided with a crank or arm coöperating with one of said levers to break the toggle and permit the fender to drop toward the tracks, substantially as described.

In testimony whereof, I have signed my name to this specification in the presence of two subscribing witnesses.

ISAAC HENRY CALIGA.

Witnesses:
   JAS. H. CHURCHILL,
   J. MURPHY.